(12) United States Patent
Ichien et al.

(10) Patent No.: US 11,395,096 B2
(45) Date of Patent: Jul. 19, 2022

(54) INFORMATION SHARING DEVICE, INFORMATION SHARING METHOD, AND RECORDING MEDIUM

(71) Applicant: NEC Corporation, Tokyo (JP)

(72) Inventors: Masumi Ichien, Tokyo (JP); Masatsugu Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/058,426

(22) PCT Filed: Jun. 4, 2018

(86) PCT No.: PCT/JP2018/021303
§ 371 (c)(1),
(2) Date: Nov. 24, 2020

(87) PCT Pub. No.: WO2019/234783
PCT Pub. Date: Dec. 12, 2019

(65) Prior Publication Data
US 2021/0211834 A1    Jul. 8, 2021

(51) Int. Cl.
*H04W 4/02* (2018.01)
*H04W 4/029* (2018.01)
*B64C 39/02* (2006.01)

(52) U.S. Cl.
CPC ........... *H04W 4/023* (2013.01); *B64C 39/024* (2013.01); *H04W 4/029* (2018.02); *B64C 2201/122* (2013.01)

(58) Field of Classification Search
CPC ..... H04W 4/023; H04W 4/029; B64C 39/024
(Continued)

(56) References Cited

U.S. PATENT DOCUMENTS

2007/0260554 A1\* 11/2007 Marui ................... H04L 9/0894
                                                                 705/71
2008/0114529 A1    5/2008 Hiruta et al.
(Continued)

FOREIGN PATENT DOCUMENTS

JP         2006-217704 A      8/2006
JP         2006-309663 A     11/2006
(Continued)

OTHER PUBLICATIONS

International Search Report for PCT Application No. PCT/JP2018/021303, dated Jul. 10, 2018.
(Continued)

*Primary Examiner* — Ted M Wang
(74) *Attorney, Agent, or Firm* — Sughrue Mion, PLLC

(57) ABSTRACT

To order to enable to improve accuracy of sensing information after being shared and to improve efficiency of control based on the sensing information when there is a possibility of loss of sensing information from another device, the information sharing device acquires a sensing result of an own device, transmits integrated information obtained by integrating information related to the sensing result of the own device and the another device stored in an integrated information storage means, receives the integrated information of the another device that is communicable, and causes the integrated information storage means to store the integrated information that is new obtained by integrating the integrated information stored in the integrated information storage means of the own device, the sensing result of the own device, and the integrated information of the another device.

17 Claims, 10 Drawing Sheets

(58) Field of Classification Search
USPC .................................................. 455/456.3
See application file for complete search history.

(56) References Cited

U.S. PATENT DOCUMENTS

| | | | |
|---|---|---|---|
| 2012/0148102 A1 | 6/2012 | Moriguchi et al. | |
| 2015/0363034 A1* | 12/2015 | Hinckley | G06F 3/04162 345/173 |
| 2016/0072893 A1 | 3/2016 | Suzuki et al. | |

FOREIGN PATENT DOCUMENTS

| | | |
|---|---|---|
| JP | 2008-078963 A | 4/2008 |
| JP | 2008-123145 A | 5/2008 |
| JP | 2012-083847 A | 4/2012 |
| JP | 2013-257798 A | 12/2013 |
| JP | 2014-138268 A | 7/2014 |
| JP | 2018-055695 A | 4/2018 |
| WO | 2011/021588 A1 | 2/2011 |
| WO | 2014/188604 A1 | 11/2014 |
| WO | 2015/059877 A1 | 4/2015 |
| WO | 2015/151192 A1 | 10/2015 |
| WO | 2017/203488 A1 | 11/2017 |
| WO | 2018/092699 A1 | 5/2018 |

OTHER PUBLICATIONS

English translation of Written opinion for PCT Application No. PCT/JP2018/021303, dated Jul. 10, 2018.
Japanese Office Action for JP Application No. 2020-523848 dated Dec. 14, 2021 with English Translation.

* cited by examiner

INFORMATION SHARING DEVICE, INFORMATION SHARING METHOD, AND RECORDING MEDIUM

This application is a National Stage Entry of PCT/JP2018/021303 filed on Jun. 4, 2018, the contents of all of which are incorporated herein by reference, in their entirety.

TECHNICAL FIELD

The present invention relates to an information sharing device, an information sharing method, and a recording medium for sharing sensing information among devices.

BACKGROUND ART

There has been a trend in which an information acquisition device (sensing device) such as a sensor or a camera is mounted on an unmanned machine and an operation is performed by a plurality of unmanned machines arranged in a specific area. For example, an application is conceivable in which a camera-equipped unmanned machine in a flying form is used to search for and monitor areas that are difficult for humans, such as disaster areas or vast areas.

As described above, when an operation is performed by a plurality of unmanned machines, it is desirable that each of the unmanned machines acts efficiently by avoiding overlap between the sensing area of the own machine and the sensing area of another machine as much as possible. For this purpose, it is necessary for each unmanned machine to share sensing information such as position information and sensing results of the unmanned machine with another machine sequentially. For this information sharing, wireless communication is mainly used.

However, when wireless communication is used for information sharing, there is a possibility that stable and continuous information sharing among unmanned machines becomes impossible due to interruption of communication caused by limitation of communication range, fluctuation of radio quality due to the environment, and influence of interfering radio waves, or the like. A loss of information from other unmanned machines may then affect the behavior of each unmanned machine, thereby reducing operational efficiency of unmanned machines.

On the other hand, PTL 1 to PTL 3 disclose methods for supplementing missing information.

In the method disclosed in PTL 1, connection candidate and identification information pairs are generated for a trajectory interrupted in a track range for mobile object, a likelihood for each pair is calculated to identify which trajectory the trajectory is associated with, and the interrupted trajectory is connected.

In the method of PTL 2, when presenting a time required for a vehicle to pass through a road section based on probe information collected by the vehicle, a missing section is interpolated based on a correlation coefficient with data of another section which is not missing.

In the method described in PTL 3, a main component analysis is performed using past probe information to linearly synthesize information having a strong correlation, and for a missing link, synthesized information of the link is used as complementary information.

However, in the methods disclosed in PTL 1 to PTL 3, batch processing is performed off-line based on past data to compensate for loss of data. Therefore, when there is insufficient data in the past or a sudden interruption occurs, each unmanned machine cannot autonomously supplement information.

A method of controlling movement of a mobile object while sharing information online is described in PTL 4 and PTL 5.

For example, in the method described in PTL 4, a communication status between a mobile terminal device and another mobile terminal device is determined based on the position of the mobile terminal device, the position of the another mobile terminal device, and surrounding geographical conditions, and a destination of the mobile terminal device is determined.

In the method described in PTL 5, when radio communication with another mobile object is interrupted, the speed and position of the mobile object after the interruption are predicted based on mobile object information received from the mobile object until the interruption. Then, movement support is performed using the predicted speed and position information.

CITATION LIST

Patent Literature

[PTL 1] WO 2011/021588 A
[PTL 2] WO 2015/059877 A
[PTL 3] JP 2008-123145 A
[PTL 4] JP 2014-138268 A
[PTL 5] WO 2015/151192 A

SUMMARY OF INVENTION

Technical Problem

However, in the methods of PTL 4 and PTL 5, when communication is interrupted, sensing information of the mobile object with which the communication is interrupted cannot be received, and thus there is a possibility that accuracy of the sensing information is deteriorated.

An object of the present invention is to provide an information sharing device, an information sharing method, and a recording medium that enable to improve accuracy of sensing information after being shared when there is a possibility of loss of sensing information from another device, and to improve efficiency of control based on the sensing information.

Solution to Problem

In order to solve the above problems, an information sharing device according to the present invention includes an acquisition means for acquiring a sensing result of an own device, a transmission means for transmitting integrated information obtained by integrating information related to the sensing result of the own device and another device stored in an integrated information storage means, a reception means for receiving the integrated information of the another device that is communicable, and an integration means for causing the integrated information storage means to store the integrated information that is new obtained by integrating the integrated information stored in the integrated information storage means of the own device, the sensing result of the own device, and the integrated information of the another device.

An information sharing method according to the present invention includes acquiring a sensing result of an own device, transmitting integrated information obtained by integrating information related to the sensing result of the own device and another device stored in an integrated information storage, receiving the integrated information of the another device that is communicable, and causing the integrated information storage to store the integrated information that is new obtained by integrating the integrated information stored in the integrated information storage of the own device, the sensing result of the own device, and the integrated information of the another device.

A computer-readable recording medium recording an information sharing program according to the present invention, the information sharing program causing a computer to execute an acquisition function for acquiring a sensing result of an own device, a transmission function for transmitting integrated information obtained by integrating information related to the sensing result of the own device and another device stored in an integrated information storage means, a reception function for receiving the integrated information of the another device that is communicable, and an integration function for causing the integrated information storage means to store the integrated information that is new obtained by integrating the integrated information stored in the integrated information storage means of the own device, the sensing result of the own device, and the integrated information of the another device.

Advantageous Effects of Invention

With the information sharing device, the information sharing method, and the recording medium of the present invention, it is possible to improve accuracy of sensing information after being shared when there is a possibility of loss of sensing information from another device, and to improve the efficiency of control based on sensing information.

EXAMPLE EMBODIMENT

First Example Embodiment

A first example embodiment of the present invention is described.

Figure 1:
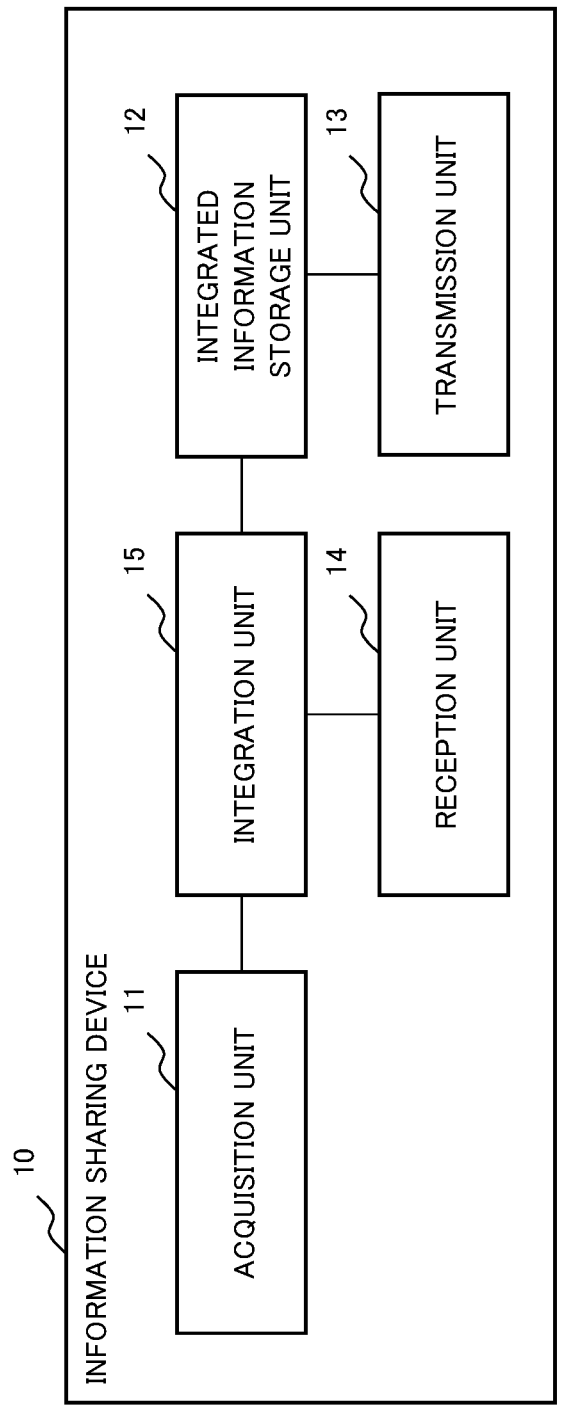
FIG. 1 shows a diagram showing a configuration example of an information sharing device according to a first example embodiment of the present invention.

FIG. 1 shows a configuration example of an information sharing device 10 of the present example embodiment.

The information sharing device 10 of the present example embodiment includes an acquisition unit 11, an integrated information storage unit 12, a transmission unit 13, a reception unit 14, and an integration unit 15.

The acquisition unit 11 acquires a sensing result of an own device. The transmission unit 13 transmits integrated information obtained by integrating information related to sensing results of the own device and another device stored in the integrated information storage unit 12. The reception unit 14 receives integrated information of another device that is communicable. The integration unit 15 causes the integrated information storage unit 12 to store the integrated information that is new obtained by integrating the integrated information stored in the integrated information storage unit 12 of the own device, the sensing result of the own device, and the integrated information of the another device.

By the information sharing device 10 configured as described above, the information sharing device 10 causes the integrated information storage unit 12 to store the integrated information that is new obtained by integrating the integrated information stored in the integrated information storage unit 12 of the own device, the sensing result of the own device, and the integrated information received from another device. The transmission unit 13 transmits the integrated information stored in the integrated information storage unit 12. Thus, the information sharing device 10 can transmit the integrated information obtained by integrating the integrated information of the own device with the sensing result of the own device and the integrated information of another device to still another device. Consequently, even if there is another device that is not communicable with the information sharing device 10, the information sharing device 10 can receive the integrated information obtained by integrating the sensing result of the another device that is not communicable via another device that is communicable, and can improve accuracy of the integrated information. Therefore, when there is a possibility of loss of sensing information from another device, it is possible to improve accuracy of sensing information (integrated information) after being shared, and to improve efficiency of control based on the sensing information.

Figure 2:
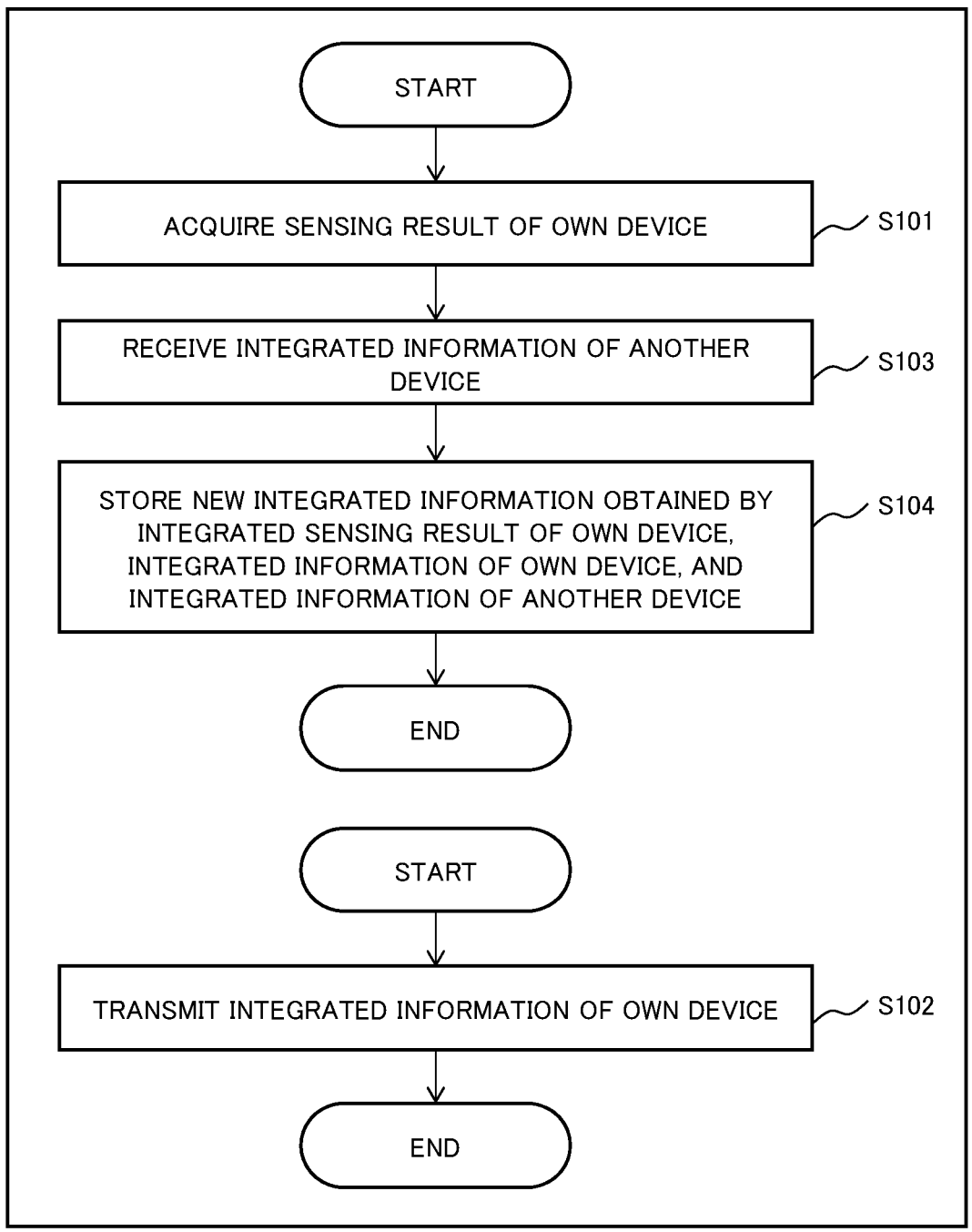
FIG. 2 shows a diagram showing an operation example of the information sharing device according to the first example embodiment of the present invention.

Next, FIG. 2 shows an example of operation of the information sharing device 10 of the present example embodiment.

The acquisition unit 11 acquires a sensing result of the own device (step S101). The transmission unit 13 transmits the integrated information stored in the integrated information storage unit 12 (step S102). The reception unit 14 receives integrated information of another device that is communicable (step S103). The integration unit 15 causes the integrated information storage unit 12 to store the integrated information that is new obtained by integrating the integrated information stored in the integrated information storage unit 12 of the own device, the sensing result of the own device, and the integrated information of the another device (step S104).

By operating as described above, the information sharing device 10 causes the integrated information storage unit 12 to store the integrated information that is new obtained by integrating the integrated information stored in the integrated information storage unit 12 of the own device, the sensing result of the own device, and the integrated information received from another device. The transmission unit 13 transmits the integrated information stored in the integrated information storage unit 12. Thus, the information sharing device 10 can transmit the integrated information obtained by integrating the integrated information of the own device with the sensing result of the own device and the integrated information of another device to still another device. Therefore, when there is a possibility of loss of sensing information from another device, it is possible to improve accuracy of sensing information after being shared, and to improve efficiency of control based on the sensing information.

As described above, in the first example embodiment of the present invention, the information sharing device 10 causes the integrated information storage unit 12 to store the integrated information that is new obtained by integrating the integrated information stored in the integrated information storage unit 12 of the own device, the sensing result of the own device, and the integrated information received from another device. The transmission unit 13 transmits the integrated information stored in the integrated information storage unit 12. Thus, the information sharing device 10 can transmit the integrated information obtained by integrating the integrated information of the own device with the sensing result of the own device and the integrated information of another device to still another device. Consequently, even if there is another device that is not communicable with the information sharing device 10, the information sharing device 10 can receive the integrated information obtained by integrating the sensing result of the another device that is not communicable via another device that is communicable, and can improve accuracy of the integrated information. Therefore, when there is a possibility of loss of sensing information from another device, it is possible to improve accuracy of sensing information after being shared, and to improve efficiency of control based on the sensing information.

Second Example Embodiment

Next, a second example embodiment of the present invention is described. In the present example embodiment, a more specific example of the information sharing device is described.

Figure 3:
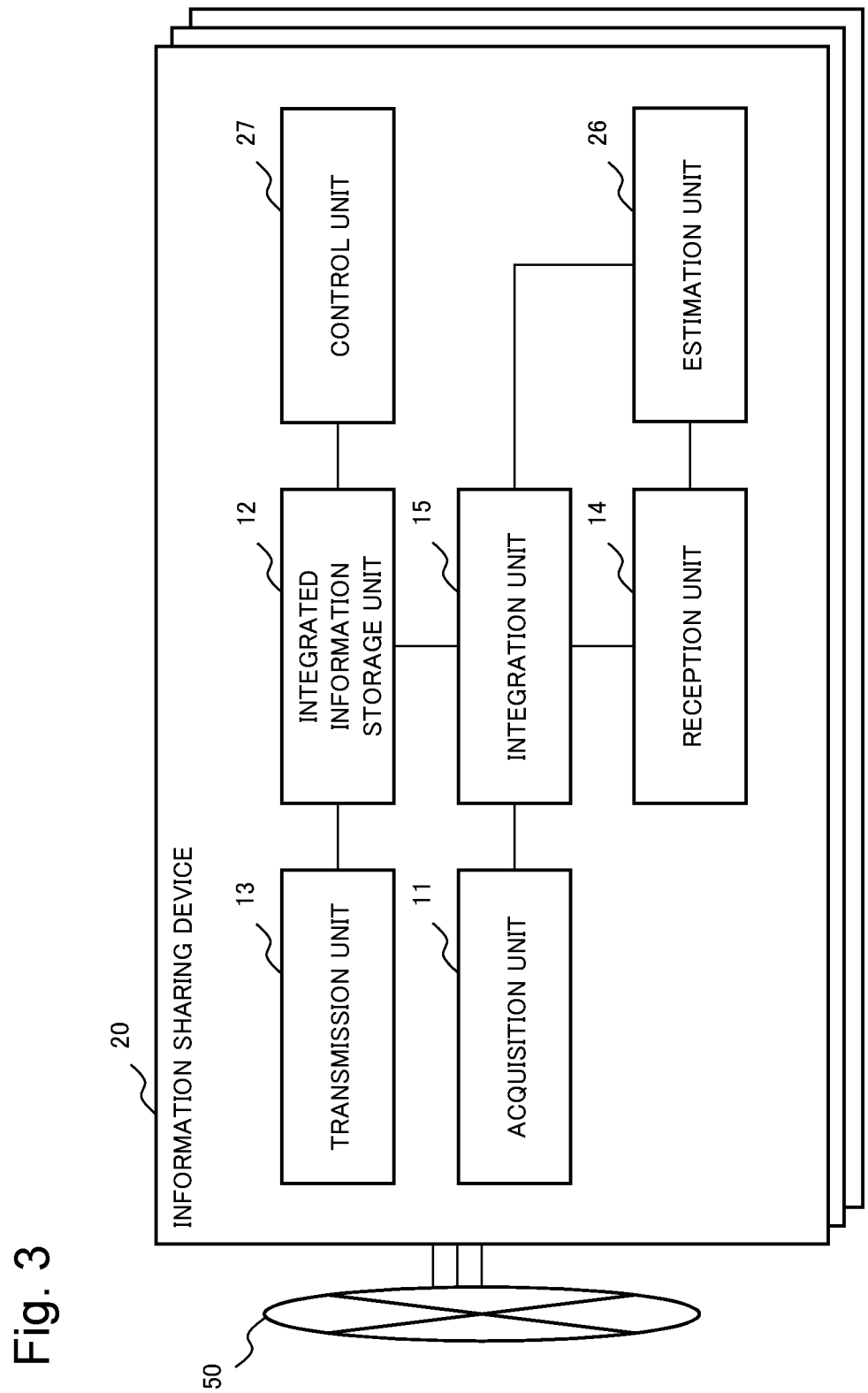
FIG. 3 shows a diagram showing a configuration example of an information sharing device according to a second example embodiment of the present invention.

First, a configuration example of an information sharing system of the present example embodiment is described with reference to FIG. 3.

The information sharing system of the present example embodiment includes one or more information sharing devices 20 and a communication network 50. The information sharing device 20 is a device mounted on an unmanned machine (for example, a robot that performs autonomous activities in water, land, and air, or the like) for sharing information between the unmanned machines. The communication network 50 is a path for sharing information among the information sharing devices 20. A method of communication in the communication network 50 is not limited to a specific method.

Next, a configuration example of the information sharing device 20 of the present example embodiment is described with reference to FIG. 3. An estimation unit 26 and a control unit 27 are added to the configuration example (FIG. 1) of the information sharing device 10 of the first example embodiment.

The acquisition unit 11 acquires a sensing result of an own device. The acquisition unit 11 acquires the sensing result from a sensing device provided in the own device, such as a camera, various radars, a sonar, or the like. The acquisition unit 11 converts the acquired sensing result into a form that can be integrated in the integration unit 15. Information acquired by the acquisition unit 11 here is a sensing result in the sensing area of the own device.

The integrated information storage unit 12 stores integrated information obtained by integrating information related to sensing results of the own device and another device.

The reception unit 14 receives integrated information of another device that is communicable. In the present example embodiment, the reception unit 14 requests another device for the integrated information of the another device, and receives the integrated information of the another device from the another device. It is assumed that the reception unit 14 of the present example embodiment further receives position information of another device and retains information related to the another device, such as an identifier of the another device, position information of the another device, communication status, and the like. The reception unit 14 can also receive information on the sensing area of another device. The integrated information received by the reception unit 14 is integrated information transmitted by the transmission unit 13 of another device.

The estimation unit 26 estimates a sensing result of another device that is not communicable. A method of estimation is described later.

The integration unit 15 causes the integrated information storage unit 12 to store the integrated information that is new obtained by integrating the integrated information stored in the integrated information storage unit 12 of the own device, the sensing result of the own device, and the integrated information of the another device. A method of integration is described later. In the present example embodiment, the integration unit 15 further integrates an estimation result estimated by the estimation unit 26 with respect to another device that is not communicable.

As described above, by the integration unit 15 integrating the sensing result of the own device, the integrated information of the own device, and the integrated information of another device, the integrated information becomes one in which the sensing result of the own device and the sensing result of the another device are integrated.

The method of storing the integrated information in the integrated information storage unit 12 is not limited to a specific method. For example, the sensing area may be divided into smaller areas, and the integrated information storage unit 12 may manage a numerical value of the integrated information for every smaller area. As a method of managing the numerical value, a method of managing a scalar value which is a single value is conceivable. For example, it is conceivable that, as a result of managing and sensing a value indicating the degree of danger as a value of the sensing result, a low numerical value is set as the value of the integrated information when there is nothing (it is safe), or conversely, a high numerical value is set as the value of the integrated information when there is an object or the like (it is dangerous). A method that manages vector values that are a plurality of values for every area is also conceivable.

When performing integration, with respect to integrated information of the own device, the integration unit 15 updates the integrated information of the own device according to an elapsed time since a previous update of the integrated information of the own device, and then performs integration. A method of updating according to the elapsed time is described later.

The transmission unit 13 transmits the integrated information stored in the integrated information storage unit 12. When transmitting the integrated information of the own device, the transmission unit 13 updates the integrated information of the own device according to the elapsed time since the previous update of the integrated information of the own device, and then transmits the integrated information to another device. In the present example embodiment, when a request is received from another device, the transmission unit 13 transmits the integrated information of the own device to the another device as the request source.

As described above, by the transmission unit 13 transmitting the integrated information to another device, the information of the another device can be transmitted to still another device. By the reception unit 14 receiving the integrated information thus transmitted, even when communication with certain another device is interrupted, information of the another device whose communication is interrupted can be obtained from another device that is communicable.

The control unit 27 controls arrangement of the own device based on the integrated information stored in the integrated information storage unit 12.

Next, a description is given of a method of updating integrated information of the own device in the integration unit 15 and the transmission unit 13.

The integration unit 15 and the transmission unit 13 update the integrated information of the own device according to an elapsed time since the previous update of the integrated information of the own device performed by the integration unit 15 or the transmission unit 13. For example, the integration unit 15 or the transmission unit 13 applies a function related to the elapsed time to the integrated information of the own device, to thereby obtain the integrated information that is new of the own device.

For example, it is assumed that the integrated information storage unit 12 stores a scalar value for a small area, and the scalar value increases according to a function according to the elapsed time, for example, Formula (1).

$$f(t) = F \times ginc^t \qquad (1)$$

Here, t is the elapsed time, f(t) is the scalar value after the time t has elapsed, F is the current scalar value, and ginc is a constant that determines the amount of increase. At this time, the integration unit 15 or the transmission unit 13 can calculate f(t) by applying the above Formula (1) to the scalar value of each small area, to thereby update the scalar value of each small area. Depending on characteristics of the sensing information, it is also possible to use a function that decreases according to the elapsed time, for example, as in Formula (2).

$$f(t) = F \times e^{-\lambda t} \qquad (2)$$

$\lambda$ is a constant that determines attenuation.

As described above, the information sharing device 20 updates the integrated information of the own device according to the elapsed time, and thus when the sensing information changes according to the elapsed time, accuracy of the integrated information can be improved. By updating according to the elapsed time, the integrated information becomes information added with the elapsed time, that is, information added with past information. Therefore, when communication with another device becomes possible from impossible, the information sharing device 20 can obtain integrated information added with past information, that is, integrated information added with information during communication interruption.

Next, a description is given of an example of a method of estimating a sensing result of another device that is not communicable in the estimation unit 26. The estimation method described here is an example, and other estimation methods may be applied to the present example embodiment.

For example, the estimation unit 26 can estimate a current position of another device based on position information of the another device received by the reception unit 14 in the past. For example, a method of estimating the current position based on position information (position and velocity) of another device, which is last received from the another device, on the assumption that the another device is moving straight at a fixed speed, is conceivable.

The estimation unit 26 can estimate the sensing area of another device, for example, based on performance and characteristics of the sensing device to be used. For example, assuming that the sensing area of another device has a simple shape (for example, a perfect circular shape centered on an estimated position), a method of estimating as the sensing area of the another device a range based on the performance and characteristics of the sensing device is conceivable.

The estimation unit 26 can estimate the sensing result for the estimated sensing area, for example, based on the performance of the sensing device used. For example, assuming that a uniform sensing result is obtained in the estimated sensing area, a method of using a uniform value based on the performance of the sensing device as the sensing result is conceivable.

As described above, the information sharing device 20 estimates the sensing result of another device that is not communicable and uses the estimated sensing result in place of the integrated information of the another device, and thereby it is possible to improve accuracy of the integrated information of the own device more than in a case where the information is missing.

Next, an example of an integration method in the integration unit 15 is described. Integration is a process of combining information related to sensing results of the own device and another device to estimate values that would be more appropriate as a sensing result of the entire system. The integration unit 15 causes the integrated information storage unit 12 to store integrated information obtained by integrating information related to sensing results of the own device and another device. The integration method described here is an example, and another integration method may be applied to the present example embodiment.

For example, it is assumed that the integrated information storage unit 12 stores a scalar value for a small area. Then, a method is conceivable in which the integration unit 15 performs integration by calculating a new scalar value for each small area, for example, according to Formula (3).

$$\text{(Value of integrated information that is new for certain small area)} = \sum_{k=1}^{q}(m_k \times S_k) \Big/ \sum_{k=1}^{q}(m_k) \qquad (3)$$

Here, $S_1$ is a value of the sensing result of the own device acquired by the acquisition unit 11. $S_2$ is a value of the integrated information of the own device stored in the integrated information storage unit 12. $S_i$ (i=3 to p) is a value of the integrated information of another device received by the reception unit 14. $S_j$ (j=p+1 to q) is a value of the sensing information of the another device estimated by the estimation unit 26. $m_k$ is a weighting coefficient for each of the elements ($S_1$, $S_2$, $S_i$, $S_j$). (p−2) is the number of pieces of the integrated information of the another device received by the reception unit 14, and (q−p) is the number of pieces of the integrated information of the another device estimated by the estimation unit 26.

When there is an element for which no value exists for a certain small area, the weighting coefficient $m_k$=0 for the element is set. For example, the value of $S_1$ does not exist for a small area outside the sensing area of the own device, and thus $m_1$=0 is set. When the weighting coefficients $m_k$ for the elements $S_k$ in which values exist are set to the same value, Formula (3) calculates the average value of the elements in which the values exist.

It is considered that reliability of the sensing result estimated by the estimation unit 26 decreases according to the elapsed time from communication interruption. Therefore, the integration unit 15 may change a weighting coefficient $m_j$ with respect to a sensing result $S_j$ estimated by the estimation unit 26 according to the elapsed time from the communication interruption. For example, the integration unit 15 may reduce the weighting coefficient $m_j$ with respect to the estimated sensing result $S_j$ according to the elapsed time from communication interruption to reduce a contribution ratio of the estimated sensing result to a calculation result of Formula (3).

Instead of using the expression (3), the integration unit 15 may use a minimum value and a maximum value of each element $S_k$ in each small area as a new scalar value. The integration unit 15 may determine a value of the integrated information that is new by an operation based on probability theory.

In order to reduce the amount of data shared among the information sharing devices 20, the transmission unit 13 may compress and transmit the integrated information, and the integrated information received by the reception unit 14 may be decompressed. By the information sharing device 20 compressing and decompressing the integrated information, a used bandwidth of the communication network 50 can be reduced.

For example, a reversible compression process (zip or the like) used in a computer or the like can be used for compression and decompression. When values are managed for every small area, a method that uses a compressing method for image data, or the like is also possible. A method of compressing the number of small areas is also possible by a method of dynamically managing the number of small areas, for example, a method of grouping small areas in which the same value continues into one small area, or the like.

By the information sharing device 20 configured as described above, the information sharing device 20 causes the integrated information storage unit 12 to store the integrated information that is new obtained by integrating the integrated information stored in the integrated information storage unit 12 of the own device, the sensing result of the own device, and the integrated information received from another device. The transmission unit 13 transmits the integrated information stored in the integrated information storage unit 12. Thus, the information sharing device 20 can transmit the integrated information obtained by integrating the integrated information of the own device with the sensing result of the own device and the integrated information of the another device to still another device. Consequently, even if there is another device that is not communicable with the information sharing device 20, the information sharing device 20 can receive the integrated information obtained by integrating the sensing result of the another device that is not communicable via another device that is communicable, and it is possible to improve accuracy of the integrated information. Therefore, when there is a possibility of loss of sensing information from another device, it is possible to improve accuracy of sensing information (integrated information) after being shared, and to improve efficiency of control based on the sensing information.

The information sharing device 20 of the present example embodiment updates the integrated information of the own device according to the elapsed time. Therefore, when the sensing result changes according to the elapsed time, accuracy of the integrated information can be improved. When communication with another device becomes possible from impossible, the information sharing device 20 can obtain integrated information added with information during the communication interruption.

The information sharing device 20 of the present example embodiment estimates a sensing result of another device that is not communicable and integrates the sensing result with the integrated information. Therefore, accuracy of the integrated information can be improved.

Figure 5:
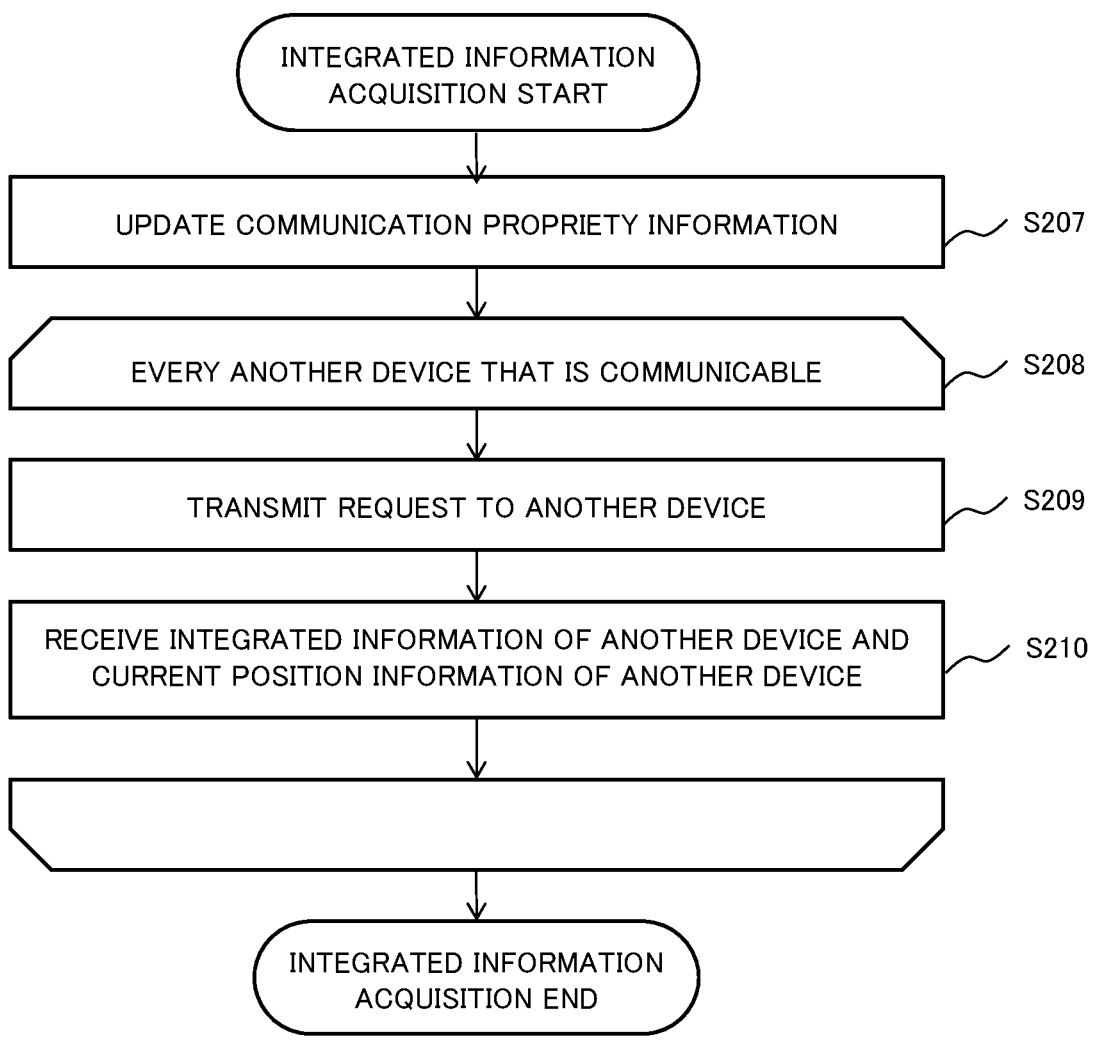
FIG. 5 shows a diagram showing an operation example of the information sharing device according to the second example embodiment of the present invention.
Figure 6:
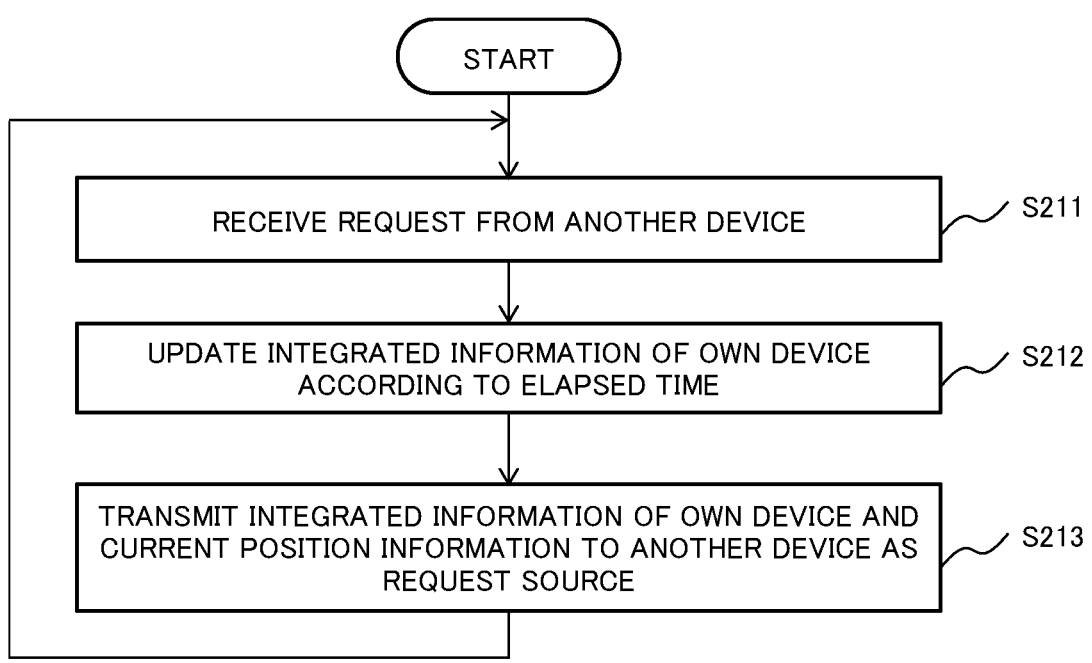
FIG. 6 shows a diagram showing an operation example of the information sharing device according to the second example embodiment of the present invention.

Next, an operation example of the information sharing device 20 of the present example embodiment is described with reference to FIGS. 4 to 6. FIG. 5 shows a more specific operation example of step S202 in FIG. 4.

Figure 4:
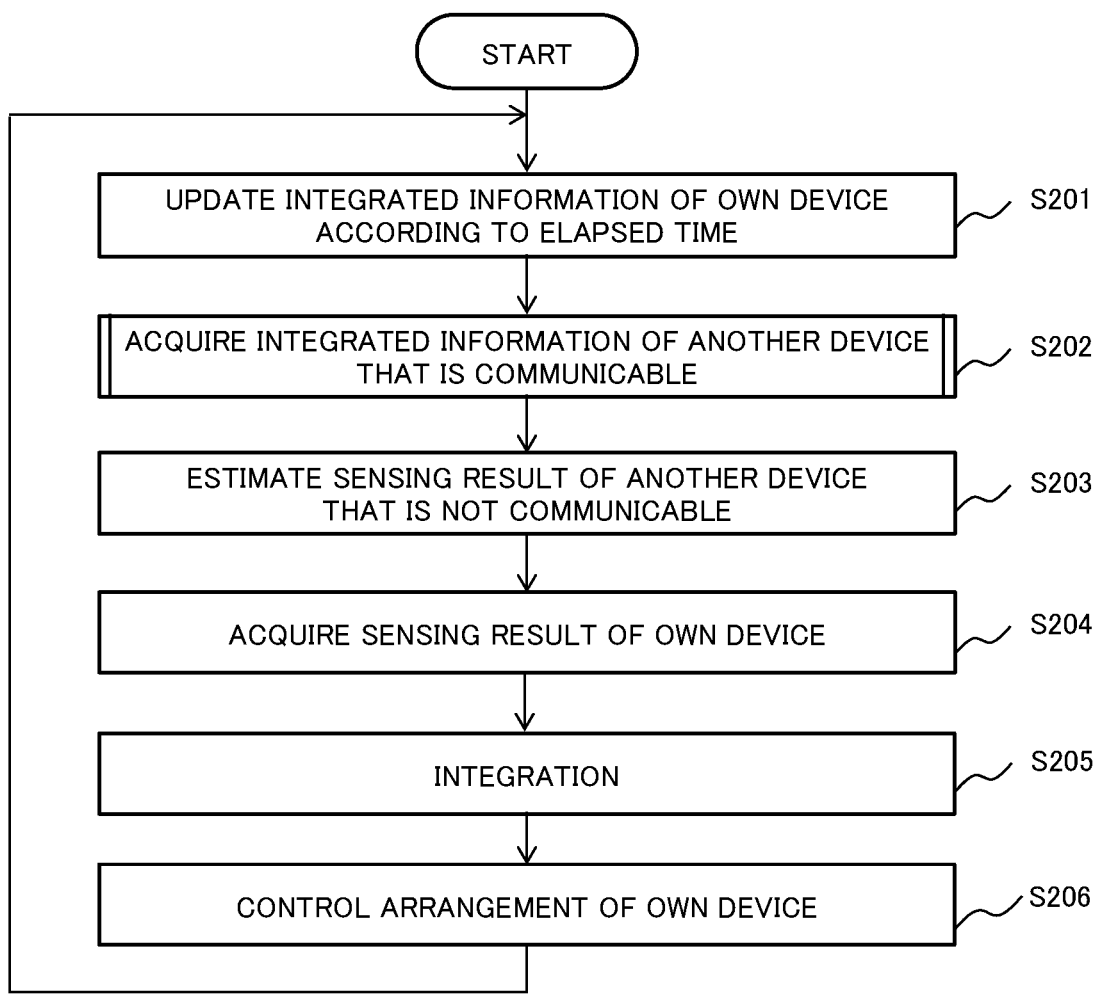
FIG. 4 shows a diagram showing an operation example of the information sharing device according to the second example embodiment of the present invention.

First, the integration unit 15 updates the integrated information stored in the integrated information storage unit 12 according to an elapsed time since a previous update (step S201 of FIG. 4). The update of the integrated information is performed in step S201 of FIG. 4 or step S212 of FIG. 6. The reception unit 14 receives integrated information and position information from another device that is communicable (step S202).

In step S202, the reception unit 14 updates communication propriety information of another device (step S207 of FIG. 5), and every another device that is communicable (step S208) transmits a request to another device (step S209). Then, integrated information of another device and current position information of the another device are received (step S210).

The estimation unit 26 estimates a sensing result of another device that is not communicable (step S203). The acquisition unit 11 acquires a sensing result of the own device (step S204). Steps S204 to S201 may be performed in parallel or in a different order.

Next, the integration unit 15 stores the integrated information obtained by integrating the sensing result of the own device, the integrated information of the own device, the integrated information of the another device, and the estimated sensing result of the another device in the integrated information storage unit 12 (step S205). Then, the control unit 27 controls an arrangement of the own device based on the integrated information of the integrated information storage unit 12 (step S206).

Upon receiving a request from another device (step S211 in FIG. 6), the reception unit 14 updates the integrated information stored in the integrated information storage unit 12 according to the elapsed time since the previous update (step S212). The integrated information of the own device and the current position information are then transmitted to the another device as the request source (step S213).

By operating as described above, the information sharing device 20 causes the integrated information storage unit 12 to store the integrated information that is new obtained by integrating the integrated information stored in the integrated information storage unit 12 of the own device, the sensing result of the own device, and the integrated information received from another device. The transmission unit 13 transmits the integrated information stored in the integrated information storage unit 12. Therefore, when there is a possibility of loss of sensing information from another device, it is possible to improve accuracy of sensing information (integrated information) after being shared, and to improve efficiency of control based on the sensing information.

As described above, in the second example embodiment of the present invention, the information sharing device 20 causes the integrated information storage unit 12 to store the integrated information that is new obtained by integrating the integrated information stored in the integrated information storage unit 12 of the own device, the sensing result of the own device, and the integrated information received from another device. The transmission unit 13 transmits the integrated information stored in the integrated information storage unit 12. Thus, the information sharing device 20 can transmit the integrated information obtained by integrating the integrated information of the own device with the sensing result of the own device and the integrated information of the another device to still another device. Consequently, even if there is another device that is not communicable with the information sharing device 20, the information sharing device 20 can receive the integrated information obtained by integrating the sensing result of the another device that is not communicable via another device that is communicable, and it is possible to improve accuracy of the integrated information. Therefore, when there is a possibility of loss of sensing information from another device, it is possible to improve accuracy of sensing information (integrated information) after being shared, and to improve efficiency of control based on the sensing information.

The information sharing device 20 of the present example embodiment updates the integrated information of the own device according to the elapsed time. Therefore, when the sensing result changes according to the elapsed time, accuracy of the integrated information can be improved. When communication with another device becomes possible from impossible, the information sharing device 20 can obtain integrated information added with information during the communication interruption.

The information sharing device 20 of the present example embodiment estimates a sensing result of another device that is not communicable and integrates the sensing result with the integrated information. Therefore, accuracy of the integrated information can be improved.

Third Example Embodiment

Next, a third example embodiment of the present invention is described. In the present example embodiment, a configuration in which position information is shared between devices in addition to the integrated information is described.

Figure 7:
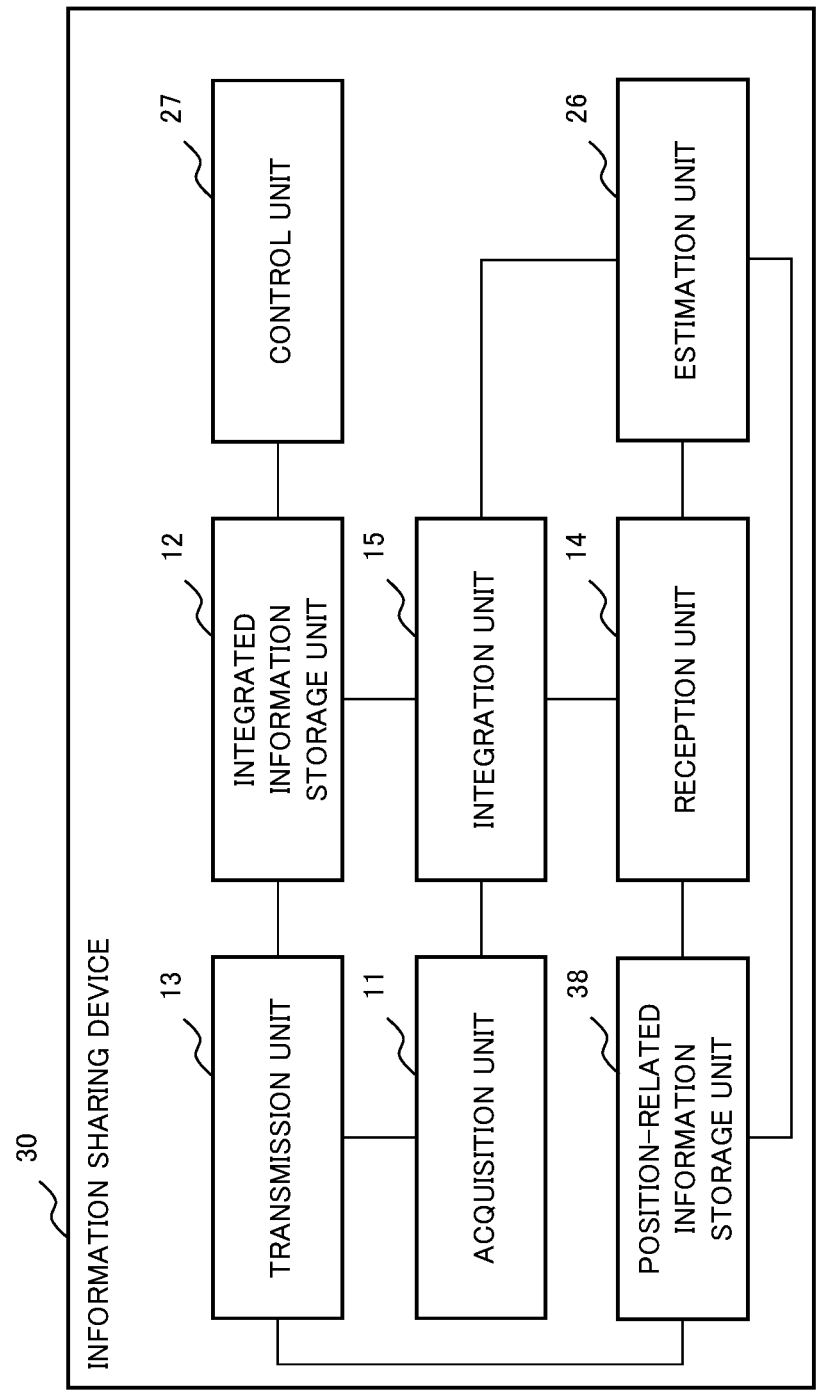
FIG. 7 shows a diagram showing a configuration example of an information sharing device according to a third example embodiment of the present invention.

First, FIG. 7 shows a configuration example of an information sharing device 30 of the present example embodiment. A configuration example of the information sharing device 30 of the present example embodiment is a configuration in which a position-related information storage unit 38 is added to the configuration example (FIG. 3) of the information sharing device 20 of the second example embodiment.

An acquisition unit 11, an integrated information storage unit 12, an integration unit 15, and a control unit 27 of the present example embodiment are similar to those of the second example embodiment.

The position-related information storage unit 38 stores position-related information regarding each of information sharing devices 30 in the information sharing system. The position-related information includes at least an identifier of an information sharing device 30 and position information of the information sharing device 30. The position-related information may further include an update time of the position information of the information sharing device 30, sensing area information of the information sharing device 30, and the communication propriety information between the own device and another device when the information sharing device 30 is the another device.

The reception unit 14 of the present example embodiment receives from another device that is communicable the position-related information stored in the position-related information storage unit 38 of the another device in addition to the integrated information of the another device. When having received the position-related information, the reception unit 14 updates the position-related information in the position-related information storage unit 38 based on the received position-related information. For example, the reception unit 14 compares an update time of the received position-related information with the update time of the position-related information stored in the position-related information storage unit 38. If the received position-related information includes information whose update time is newer, the position-related information stored in the position-related information storage unit 38 is updated with the information.

In addition to the integrated information of the own device, the transmission unit 13 of the present example embodiment transmits the position-related information stored in the position-related information storage unit 38 to another device.

When estimating a sensing result of another device that is not communicable, the estimation unit 26 of the present example embodiment estimates the sensing result based on the position-related information stored in the position-related information storage unit 38. For example, the estimation unit 26 can estimate the current position of the another device by using the position-related information stored in the position-related information storage unit 38 instead of the "position information of another device received in the past" in the second example embodiment. When the position-related information also includes information of sensing areas, for example, the latest sensing area of the another device can be estimated as the current sensing area of the another device.

As described above, it is possible to update the position-related information regarding another device that is not communicable with the own device via another device that is communicable with the own device. Consequently, estimation accuracy of the current position of another device can be improved, and therefore, estimation accuracy of the sensing result of the another device in the estimation unit 26 can be improved.

By the information sharing device 30 configured as described above, the information sharing device 30 causes the integrated information storage unit 12 to store the integrated information that is new obtained by integrating the integrated information stored in the integrated information storage unit 12 of the own device, the sensing result of the own device, and the integrated information received from another device. The transmission unit 13 transmits the integrated information stored in the integrated information storage unit 12. Thus, the information sharing device 30 can transmit the integrated information obtained by integrating the integrated information of the own device with the sensing result of the own device and the integrated information of another device to still another device. Consequently, even if there is another device that is not communicable with the information sharing device 30, the information sharing device 30 can receive the integrated information obtained by integrating a sensing result of the another device that is not communicable via another device that is communicable, and it is possible to improve accuracy of the integrated information. Therefore, when there is a possibility of loss of sensing information from another device, it is possible to improve accuracy of sensing information (integrated information) after being shared, and to improve efficiency of control based on the sensing information.

The information sharing device 30 of the present example embodiment receives the position-related information from another device, updates the position-related information stored in the own device based on the received position-related information, and transmits the updated position-related information to the another device. Thus, it is possible to update the position-related information regarding the another device that is not communicable with the own device via another device that is communicable with the own device. Consequently, it is possible to improve estimation accuracy of the sensing result of another device in the estimation unit 26.

Figure 8:
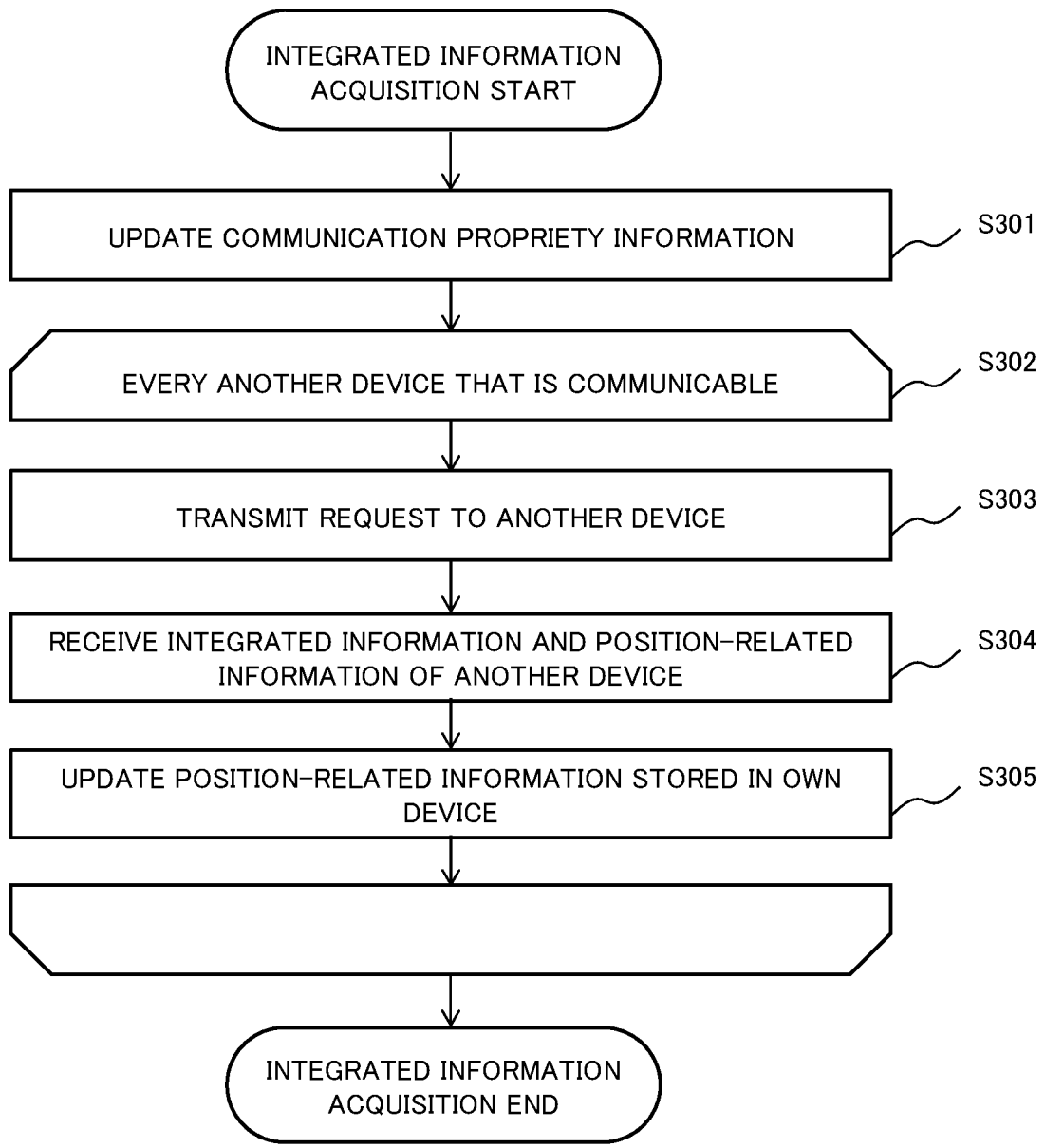
FIG. 8 shows a diagram showing an operation example of an information sharing device according to the third example embodiment of the present invention.

Next, an operation example of the information sharing device 30 of the present example embodiment is described with reference to FIGS. 4, 8, and 9. FIG. 8 shows a more specific operation example of step S202 (integrated information acquisition operation) of FIG. 4.

A general flow of operation of the information sharing device 30 is similar to that of the operation example of the second example embodiment (FIG. 4).

Figure 9:
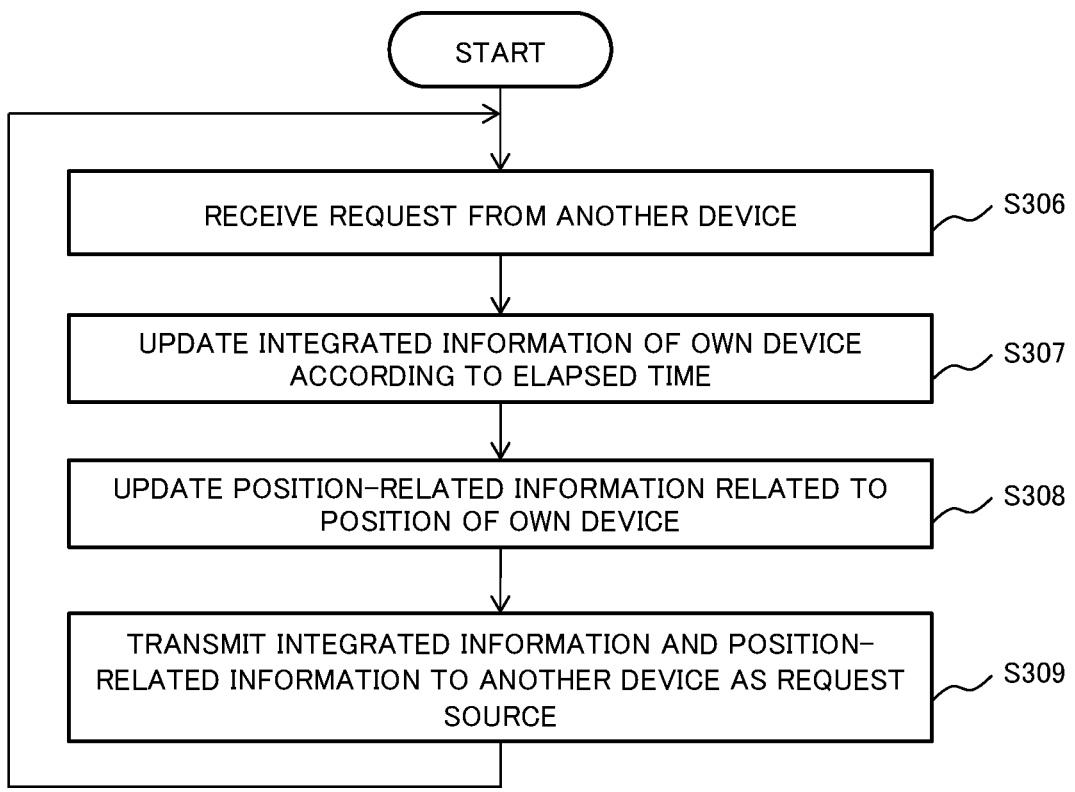
FIG. 9 shows a diagram showing an operation example of an information sharing device according to the third example embodiment of the present invention.

In step S308 of FIG. 9, the transmission unit 13 of the present example embodiment updates the position-related information related to the own device of the position-related information storage unit 38 with the latest position information of the own device. In step S309 of FIG. 9, the transmission unit 13 transmits the position-related information stored in the position-related information storage unit 38 instead of the current position information.

In step S304 of FIG. 8, the reception unit 14 of the present example embodiment receives the position-related information stored in the position-related information storage unit 38 of the another device instead of the current position information of the another device. In step S305 of FIG. 8, the reception unit 14 updates the position-related information stored in the position-related information storage unit 38 based on the received position-related information.

In step S203 of FIG. 4, the estimation unit 26 estimates the sensing result of the another device that is not communicable based on the position-related information stored in the position-related information storage unit 38. In the present example embodiment, since the position-related information updated in step S202 is used in step S203, step S203 needs to be performed between step S202 and step S205.

The other operations are similar to those in the second example embodiment, and thus the description thereof is omitted.

By operating as described above, the information sharing device 30 causes the integrated information storage unit 12 to store the integrated information that is new obtained by integrating the integrated information stored in the integrated information storage unit 12 of the own device, the sensing result of the own device, and the integrated information received from another device. The transmission unit 13 transmits the integrated information stored in the integrated information storage unit 12. Therefore, when there is a possibility of loss of sensing information from another device, it is possible to improve accuracy of sensing information (integrated information) after being shared, and to improve efficiency of control based on the sensing information.

As described above, in the third example embodiment of the present invention, the information sharing device 30 causes the integrated information storage unit 12 to store the integrated information that is new obtained by integrating the integrated information stored in the integrated information storage unit 12 of the own device, the sensing result of the own device, and the integrated information received from another device. The transmission unit 13 transmits the integrated information stored in the integrated information storage unit 12. Thus, the information sharing device 30 can transmit the integrated information obtained by integrating the integrated information of the own device with the sensing result of the own device and the integrated information of another device to still another device. Consequently, even if there is another device that is not communicable with the information sharing device 30, the information sharing device 30 can receive the integrated information obtained by integrating a sensing result of the another device that is not communicable via another device that is communicable, and it is possible to improve accuracy of the integrated information. Therefore, when there is a possibility of loss of sensing information from another device, it is possible to improve accuracy of sensing information (integrated information) after being shared, and to improve efficiency of control based on the sensing information.

The information sharing device 30 of the present example embodiment receives the position-related information from another device, updates the position-related information stored in the own device based on the received position-related information, and transmits the updated position-related information to the another device. Thus, it is possible to update the position-related information regarding the another device that is not communicable with the own device via another device that is communicable with the own device. Consequently, it is possible to improve estimation accuracy of the sensing result of another device in the estimation unit 26.

[Hardware Configuration Example]

A configuration example of hardware resources for achieving the information sharing device (10, 20, 30) according to each of the example embodiments of the present invention described above by using one information processing device (computer) is described. The information sharing device may be achieved by using at least two information processing devices physically or functionally. The information sharing device may be achieved as a dedicated device. Only a part of the functions of the information sharing device may be achieved by using the information processing device.

Figure 10:
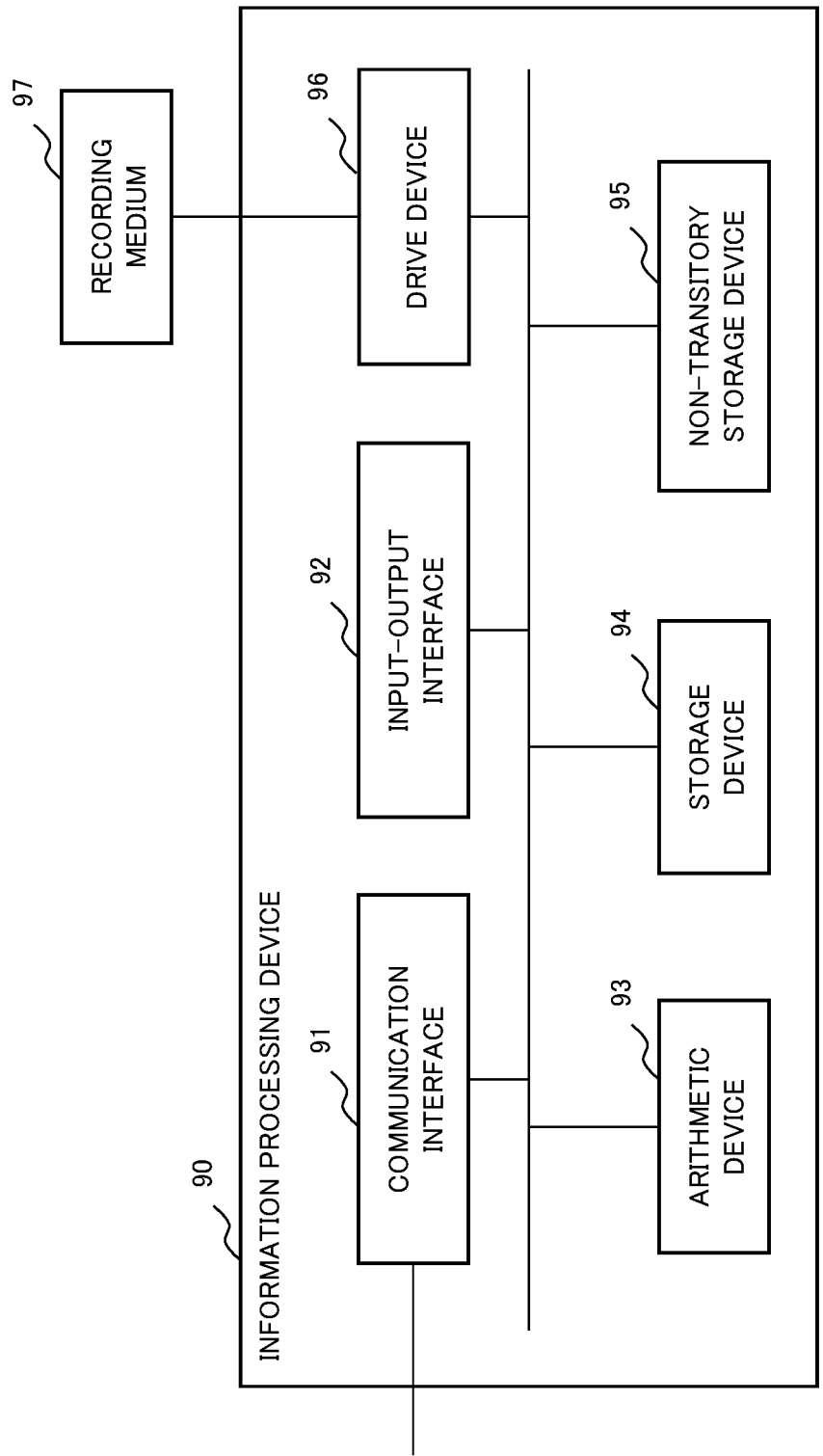
FIG. 10 shows a diagram showing a hardware configuration example of each example embodiment of the present invention.

FIG. 10 is a diagram schematically showing a hardware configuration example of the information processing device capable of achieving the information sharing device of each of the example embodiments of the present invention. The information processing device 90 includes a communication interface 91, an input-output interface 92, an arithmetic device 93, a storage device 94, a non-transitory storage device 95, and a drive device 96.

The communication interface 91 is a communication means for the information sharing device of each of the example embodiments to communicate with an external device by wire or/and wireless. In a case where the information sharing device is achieved by using at least two information processing devices, the devices may be connected so as to be able to communicate with each other via the communication interface 91.

The input-output interface 92 is a man-machine interface such as a keyboard as an example of an input device and a display as an output device.

The arithmetic device 93 is an arithmetic processing device such as a general-purpose central processing unit (CPU) or a microprocessor. For example, the arithmetic device 93 can read various programs stored in the non-transitory storage device 95 into the storage device 94 and execute processing according to the read programs.

The storage device 94 is a memory device such as a random access memory (RAM), which can be referred to from the arithmetic device 93, and stores programs, various data, and the like. The storage device 94 may be a volatile memory device.

The non-transitory storage device 95 is a non-transitory storage device such as a read only memory (ROM), a flash memory, or the like, and can store various programs, data, and the like.

The drive device 96 is, for example, a device that reads or writes data to a recording medium 97, which is described later.

The recording medium 97 is, for example, any recording medium capable of recording data, such as an optical disk, a magneto-optical disk, a semiconductor flash memory, or the like.

Each of the example embodiments of the present invention may be achieved, for example, by configuring an information sharing device with the information processing device 90 illustrated in FIG. 10, and supplying to the information sharing device a program capable of achieving the functions described in each of the example embodiments described above.

In this case, the example embodiment can be achieved by executing a program supplied to the information sharing device by the arithmetic device 93. It is also possible to configure not all but a part of the functions of the information sharing device by the information processing device 90.

The program may be recorded on the recording medium 97, and the program may be appropriately stored in the non-transitory storage device 95 in a shipping stage, an operating stage, or the like of the information sharing device. In this case, as a method of supplying the program, a method of installing the program in the information sharing device using an appropriate jig may be employed in a manufacturing stage before shipment, an operating stage, or the like. The program may be supplied by a general procedure such as downloading from the outside through a communication line such as the Internet.

The whole or part of the example embodiments disclosed above can be described as, but not limited to, the following supplementary notes.

(Supplementary Note 1)

An information sharing device comprising:

an acquisition means for acquiring a sensing result of an own device;

a transmission means for transmitting integrated information obtained by integrating information related to the sensing result of the own device and another device stored in an integrated information storage means;

a reception means for receiving the integrated information of the another device that is communicable; and an integration means for causing the integrated information storage means to store the integrated information that is new obtained by integrating the integrated information stored in the integrated information storage means of the own device, the sensing result of the own device, and the integrated information of the another device.

(Supplementary Note 2)

The information sharing device according to supplementary note 1, further comprising a control means for controlling the own device based on the integrated information stored in the integrated information storage means.

(Supplementary Note 3)

The information sharing device according to supplementary note 1 or 2, wherein the integration means updates the integrated information of the own device according to an elapsed time since a time of a previous update of the integrated information of the own device, and thereafter integrates the integrated information of the own device.

(Supplementary Note 4)

The information sharing device according to any one of supplementary notes 1 to 3, wherein the transmission means updates the integrated information of the own device according to an elapsed time since a time of a previous update of the integrated information of the own device, and thereafter transmits the integrated information of the own device.

(Supplementary Note 5)

The information sharing device according to any one of supplementary notes 1 to 4, further comprising an estimation means for estimating the sensing result of the another device that is not communicable, wherein the integration means further integrates the sensing result that is estimated of the another device.

(Supplementary Note 6)

The information sharing device according to supplementary note 5, wherein

The reception means further receives position information of the another device, and the estimation means estimates a current position of the another device based on the position information of the another device.

(Supplementary Note 7)

The information sharing device according to any one of supplementary notes 1 to 6, wherein the reception means further receives position-related information related to a position of the another device and updates the position-related information stored in a position-related information storage means based on the position-related information, and the transmission means further transmits the position-related information stored in the position-related information storage means.

(Supplementary Note 8)

The information sharing device according to supplementary note 5, wherein the reception means further receives position-related information related to a position of the another device and updates the position-related information stored in a position-related information storage means based on the position-related information, the transmission means further transmits the position-related information stored in the position-related information storage means, and the estimation means estimates a current position of the another device based on the position-related information stored in the position-related information storage means.

(Supplementary Note 9)

An information sharing method comprising:

acquiring a sensing result of an own device;

transmitting integrated information obtained by integrating information related to the sensing result of the own device and another device stored in an integrated information storage means;

receiving the integrated information of the another device that is communicable; and causing the integrated information storage means to store the integrated information that is new obtained by integrating the integrated information stored in the integrated information storage means of the own device, the sensing result of the own device, and the integrated information of the another device.

(Supplementary Note 10)

The information sharing method according to supplementary note 9, further comprising controlling the own device based on the integrated information stored in the integrated information storage means.

(Supplementary Note 11)

The information sharing method according to supplementary note 9 or 10, further comprising updating the integrated information of the own device according to an elapsed time since a time of a previous update of the integrated information of the own device, and thereafter integrating the integrated information of the own device.

(Supplementary Note 12)

The information sharing method according to any one of supplementary notes 9 to 11, further comprising updating the integrated information of the own device according to an elapsed time since a time of a previous update of the integrated information of the own device, and thereafter transmitting the integrated information of the own device.

(Supplementary Note 13)

The information sharing method according to any one of supplementary notes 9 to 12, further comprising:

estimating the sensing result of the another device that is not communicable; and further integrating the sensing result that is estimated of the another device.

(Supplementary Note 14)

The information sharing method according to supplementary note 13, further comprising:

receiving position information of the another device; and estimating a current position of the another device based on the position information of the another device.

(Supplementary Note 15)

The information sharing method according to any one of supplementary notes 9 to 14, further comprising:

receiving position-related information related to a position of the another device and updating the position-related information stored in a position-related information storage means based on the position-related information; and transmitting the position-related information stored in the position-related information storage means.

(Supplementary Note 16)

The information sharing method according to supplementary note 13, further comprising:

receiving position-related information related to a position of the another device and updating the position-related information stored in a position-related information storage means based on the position-related information;

transmitting the position-related information stored in the position-related information storage means; and estimating a current position of the another device based on the position-related information stored in the position-related information storage means.

(Supplementary Note 17)

A computer-readable recording medium recording an information sharing program, the information sharing program causing a computer to execute:

an acquisition function for acquiring a sensing result of an own device;

a transmission function for transmitting integrated information obtained by integrating information related to the sensing result of the own device and another device stored in an integrated information storage means;

a reception function for receiving the integrated information of the another device that is communicable; and an integration function for causing the integrated information storage means to store the integrated information that is new obtained by integrating the integrated information stored in the integrated information storage means of the own device, the sensing result of the own device, and the integrated information of the another device.

(Supplementary Note 18)

The computer-readable recording medium recording the information sharing program according to supplementary note 17, the information sharing program causing the computer to further execute a control function for controlling the own device based on the integrated information stored in the integrated information storage means.

(Supplementary Note 19)

The computer-readable recording medium recording the information sharing program according to supplementary note 17 or 18, wherein the integration function updates the integrated information of the own device according to an elapsed time since a time of a previous update of the integrated information of the own device, and thereafter integrates the integrated information of the own device.

(Supplementary Note 20)

The computer-readable recording medium recording the information sharing program according to any one of supplementary notes 17 to 19, wherein the transmission function updates the integrated information of the own device according to an elapsed time since a time of a previous update of the integrated information of the own device, and thereafter transmits the integrated information of the own device.

(Supplementary Note 21)

The computer-readable recording medium recording the information sharing program according to any one of supplementary notes 17 to 20, the information sharing program causing the computer to further execute an estimation function for estimating the sensing result of the another device that is not communicable, wherein the integration function further integrates the sensing result that is estimated of the another device.

(Supplementary Note 22)

The computer-readable recording medium recording the information sharing program according to supplementary note 21, wherein the reception function further receives position information of the another device, and the estimation function estimates a current position of the another device based on the position information of the another device.

(Supplementary Note 23)

The computer-readable recording medium recording the information sharing program according to any one of supplementary notes 17 to 22, wherein the reception function further receives position-related information related to a position of the another device and updates the position-related information stored in a position-related information storage means based on the position-related information, and the transmission function further transmits the position-related information stored in the position-related information storage means.

(Supplementary Note 24)

The computer-readable recording medium recording the information sharing program according to supplementary note 21, wherein the reception function further receives position-related information related to a position of the another device and updates the position-related information stored in a position-related information storage means based on the position-related information, the transmission function further transmits the position-related information stored in the position-related information storage means, and the estimation function estimates a current position of the another device based on the position-related information stored in the position-related information storage means.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 10, 20, 30 Information sharing device
11 Acquisition unit
12 Integrated information storage unit
13 Transmission unit
14 Reception unit
15 Integration unit
26 Estimation unit
27 Control unit
38 Position-related information storage unit
90 Information processing device
91 Communication interface
92 Input-output interface
93 Arithmetic device
94 Storage device
95 Non-transitory storage device
96 Drive device
97 Recording medium

What is claimed is:

1. An information sharing device comprising one or more memories storing instructions and one or more processors configured to execute the instructions to:
   acquire a sensing result of an own device;
   transmit integrated information obtained by integrating information related to the sensing result of the own device and another device stored in an integrated information storage;
   receive the integrated information of the another device that is communicable;
   cause the integrated information storage to store the integrated information that is newly obtained by integrating the integrated information stored in the integrated information storage of the own device, the sensing result of the own device, and the integrated information of the another device, and
   update the integrated information of the own device according to an elapsed time since a time of a previous update of the integrated information of the own device, and thereafter integrate the integrated information of the own device.

2. The information sharing device according to claim 1, wherein the one or more processors are configured to execute the instructions to
   control the own device based on the integrated information stored in the integrated information storage.

3. The information sharing device according to claim 1, wherein the one or more processors are configured to execute the instructions to
   after updating the integrated information of the own device according to the elapsed time since the time of the previous update of the integrated information of the own device, transmits the integrated information of the own device.

4. The information sharing device according to claim 1, wherein the one or more processors are configured to execute the instructions to
   estimate the sensing result of the another device that is not communicable, and
   further integrate the sensing result that is estimated of the another device.

5. The information sharing device according to claim 4, wherein the one or more processors are configured to execute the instructions to
   further receive position information of the another device, and
   estimate a current position of the another device based on the position information of the another device.

6. The information sharing device according to claim 1, wherein the one or more processors are configured to execute the instructions to
   further receive position-related information related to a position of the another device and update the position-related information stored in a position-related information storage based on the position-related information, and
   further transmit the position-related information stored in the position-related information storage.

7. The information sharing device according to claim 4, wherein the one or more processors are configured to execute the instructions to
   further receive position-related information related to a position of the another device and update the position-related information stored in a position-related information storage based on the position-related information, further transmit the position-related information stored in the position-related information storage, and estimate a current position of the another device based on the position-related information stored in the position-related information storage.

8. An information sharing method comprising:

acquiring a sensing result of an own device;

transmitting integrated information obtained by integrating information related to the sensing result of the own device and another device stored in an integrated information storage;

receiving the integrated information of the another device that is communicable;

causing the integrated information storage to store the integrated information that is newly obtained by integrating the integrated information stored in the integrated information storage of the own device, the sensing result of the own device, and the integrated information of the another device, and updating the integrated information of the own device according to an elapsed time since a time of a previous update of the integrated information of the own device, and thereafter integrating the integrated information of the own device.

9. The information sharing method according to claim 8, further comprising controlling the own device based on the integrated information stored in the integrated information storage.

10. The information sharing method according to claim 8, further comprising after updating the integrated information of the own device according to the elapsed time since the time of the previous update of the integrated information of the own device, transmitting the integrated information of the own device.

11. The information sharing method according to claim 8, further comprising:

estimating the sensing result of the another device that is not communicable; and further integrating the sensing result that is estimated of the another device.

12. The information sharing method according to claim 11, further comprising:

receiving position information of the another device; and estimating a current position of the another device based on the position information of the another device.

13. The information sharing method according to claim 8, further comprising:

receiving position-related information related to a position of the another device and updating the position-related information stored in a position-related information storage based on the position-related information; and transmitting the position-related information stored in the position-related information storage.

14. The information sharing method according to claim 11, further comprising:

receiving position-related information related to a position of the another device and updating the position-related information stored in a position-related information storage-based on the position-related information;

transmitting the position-related information stored in the position-related information storage; and estimating a current position of the another device based on the position-related information stored in the position-related information storage.

15. A non-transitory computer-readable recording medium recording an information sharing program, the information sharing program causing a computer to execute:

an acquisition function for acquiring a sensing result of an own device;

a transmission function for transmitting integrated information obtained by integrating information related to the sensing result of the own device and another device stored in an integrated information storage;

a reception function for receiving the integrated information of the another device that is communicable;

an integration function for causing the integrated information storage to store the integrated information that is newly obtained by integrating the integrated information stored in the integrated information storage of the own device, the sensing result of the own device, and the integrated information of the another device, wherein the integration function updates the integrated information of the own device according to an elapsed time since a time of a previous update of the integrated information of the own device, and thereafter integrates the integrated information of the own device.

16. The non-transitory computer-readable recording medium recording the information sharing program according to claim 15, the information sharing program causing the computer to further execute a control function for controlling the own device based on the integrated information stored in the integrated information storage.

17. The non-transitory computer-readable recording medium recording the information sharing program according to claim 15, wherein after the integrated information of the own device is updated according to the elapsed time since the time of the previous update of the integrated information of the own device, transmitting the integrated information of the own device.

* * * * *